US 7,902,126 B1

(12) United States Patent
Burts, Jr.

(10) Patent No.: US 7,902,126 B1
(45) Date of Patent: *Mar. 8, 2011

(54) WELL LOST CIRCULATION ADDITIVE, LOST CIRCULATION TREATMENT FLUID MADE THEREFROM, METHOD OF MINIMIZING LOST CIRCULATION IN A SUBTERRANEAN FORMATION

(76) Inventor: Boyce D. Burts, Jr., Mauria, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/296,217

(22) Filed: Apr. 22, 1999

Related U.S. Application Data

(62) Division of application No. 08/962,215, filed on Oct. 31, 1997, now Pat. No. 6,016,879.

(51) Int. Cl.
*C09K 8/68* (2006.01)
(52) U.S. Cl. .......... 507/200; 507/90; 507/269; 507/276; 137/1
(58) Field of Classification Search ............ 507/104, 507/204, 908, 904, 90, 200, 269, 276; 137/1
See application file for complete search history.

(56) References Cited

U.S. PATENT DOCUMENTS

| 3,208,524 | A | * | 9/1965 | Horner et al. | 166/32 |
| 3,408,296 | A |   | 10/1968 | Kuhn et al. | 166/283 X |
| 3,766,984 | A |   | 10/1973 | Nimerick | 166/295 X |
| 3,845,822 | A |   | 11/1974 | Clampitt et al. | 166/281 |
| 4,183,406 | A |   | 1/1980 | Lundberg et al. | 166/295 |
| 4,566,979 | A | * | 1/1986 | Githens | 507/209 |
| 4,722,397 | A | * | 2/1988 | Sydansk et al. | 166/295 |
| 4,957,166 | A | * | 9/1990 | Sydansk | 166/295 |
| 4,989,673 | A | * | 2/1991 | Sydansk | 166/250 |
| 5,004,553 | A | * | 4/1991 | House et al. | 507/229 |
| 5,229,018 | A | * | 7/1993 | Forrest | 507/209 |
| 5,246,602 | A |   | 9/1993 | Forrest | 166/283 |
| 5,377,760 | A | * | 1/1995 | Merrill | 166/295 |
| 5,415,229 | A | * | 5/1995 | Sydansk | 166/295 |
| 5,421,411 | A |   | 6/1995 | Sydansk | 166/295 |
| 5,501,275 | A |   | 3/1996 | Card et al. | 166/280 |

* cited by examiner

*Primary Examiner* — Jyoti Nagpaul
(74) *Attorney, Agent, or Firm* — Gilbreth Roebuck PC; J. M. (Mark) Gilbreth; Mary A. Gilbreth

(57) ABSTRACT

For lost circulation treatment, a lost circulation additive including a dry mixture of water soluble crosslinkable polymer, a crosslinking agent, and a reinforcing material of fibers and/or comminuted plant materials. The method of forming a lost circulation fluid includes contacting the additive with water or an aqueous solution, with a method of conforming the formation further including the step of injecting the fluid into the wellbore.

13 Claims, No Drawings

WELL LOST CIRCULATION ADDITIVE, LOST CIRCULATION TREATMENT FLUID MADE THEREFROM, METHOD OF MINIMIZING LOST CIRCULATION IN A SUBTERRANEAN FORMATION

This application is a divisional of U.S. application Ser. No. 08/962,215, now U.S. Pat. No. 6,016,879, filed on Oct. 31, 1997, the entire disclosure of which is hereby incorporated by reference

BACKGROUND OF THE INVENTION

1. Field of the Invention

The present invention relates to lost circulation additives, to lost circulation treatment fluids made therefrom, to methods of minimizing lost circulation in a well. In another aspect, the present invention relates to lost circulation additives comprising polymer and fibers or comminuted plant materials, to lost circulation treatment fluids made therefrom, to methods of minimizing lost circulation in a well using such fluids.

2. Description of the Related Art

Subterranean wells are utilized to reach desirable oil and/or gas bearing formations, and are generally drilled utilizing rotary drilling techniques. In such rotary drilling of wells for oil and gas, drilling fluids ("muds") are circulated into the well through hollow tubular drill pipe, past the teeth of the cutter head to sweep away the cuttings from the cutter head, and returned to the surface along with the cuttings through the annulus surrounding the drill pipe. The drilling fluid is generally circulated in such a manner as to remove drill cuttings to prevent clogging of the cutter and to support the walls of the well hole. Such drill cuttings are entrained in the drilling fluid and brought to the surface with the fluid and then screened out and discarded. In addition to removing drill cuttings and supporting the walls of the well hole, the drilling fluid also serves to cool and lubricate the drill bit and, in the case of systems employing downhole drill motors, it functions as a power fluid for the drill motor.

Typically, drilling fluids may be water-base, employing a base of fresh water, salt water, or an oil-in-water emulsion in which water forms the continuous phase, or oil-base, employing a relatively pure oil such as crude petroleum oil or diesel oil, or in may be an "invert" emulsion, a water-in-oil emulsion in which oil forms the continuous phase or a synthetic base employing a polymer.

Drilling fluids normally contain clays and/or other dispersed solids which are employed to impart desired rheological properties to the drilling fluid. Not only do these clays and/or other suspended solids impart desirable thixotropic properties to the drilling fluid, they also serve to coat the walls of the well with a relatively impermeable sheath, commonly termed a filter cake, which retards the flow of fluid from the well into the surrounding subterranean formations.

In addition to clays and/or other suspended particles, a drilling fluid may also contain one or more weighting agents which function to increase the density of the fluid to a level which will offset high pressures encountered during the drilling operation. Non-limiting examples of suitable weighting agents which may be used in either water base or oil base drilling fluids include heavy minerals such as barite and gelena.

One problem very commonly encountered during rotary drilling operations is the problem of lost circulation in which part or all of the drilling fluid is not returned to the surface. This problem may manifest itself anywhere from moderate losses of the drilling fluid, to substantial or even total losses of the drilling fluid such that little or none of it is returned to the surface. Where a formation zone is identified in which unacceptably large amounts of drilling fluid is lost, such formation zone is commonly termed a "loss zone" or a loss circulation zone." While there are many causes for loss circulation, non-limiting examples include those situations when the well encounters a formation of unusually high permeability or one which has naturally occurring horizontal or vertical fractures or fissures. Also, the formation may be fractured accidentally by the hydrostatic pressure exerted by the drilling mud, particularly when a change over to a relatively heavy mud is made in order to control high formation pressures.

As can be expected, over the years numerous techniques have been developed to prevent or reduce loss circulation. One common technique where the loss circulation is not so severe is to add various fluid loss agents which function to change the rheological properties of the drilling mud in order to increase its resistance to flow from the well bore into the formation. Such fluid loss agents include synthetic polymeric thickening agents such as partially hydrolyzed polyacrylamide, polyelectrolite such as an ionic polysaccharide, various gums such as locust bean gum and guar gum, various starches, and carboxymethylcellulose (CMC) or carboxyethylcellulose (CEC).

Where the loss circulation is more severe, it is a normal practice to incorporate into the drilling mud various bulk materials which function to combat or prevent loss circulation. It has been common in the past to add any number of materials to the drilling fluid which act to reduce or prevent flow of the drilling fluid from the well hole to the formation. These materials are commonly referred to as "loss (or lost) circulation additives". Such prior art loss circulation materials include fibrous, flake (or laminated), and granular materials. A nonexhaustive list of such loss circulation includes nut and seed shells or hulls (peanut almond, walnut, peach, brazil, coconut, peanut, sunflower, flax, cocoa bean, cottonseed, rice, linseed); crude pectate pulp; feathers; citrus pulp; beet pulp; peat moss fibers; jute; flax; mohair; lechuguilla fibers; cotton; cotton linters; wool; paper; wet-strength paper; sugar cane; bagasse; bamboo; corn stalks; sawdust; straw; wood fiber; cedar fiber; bark chips; cork; popped popcorn; dehydrated vegetable matter (suitably dehydrated carbohydrates such as citrus pulp, oatmeal, tapioca, rice grains, potatoes, carrots, beets, and various grain sorghams); the ground woody ring portion of corn cobs; whole ground corn cobs; hydrophobic, organophilic, water-wettable fibrous materials such as treated cotton, dried bagasse, and dried peat fibers; and specific mixtures of these materials. Many assorted inorganic materials have also been utilized as loss circulation materials.

Seepage losses can occur to any type of loss zone and in any type of formation when the particles in the drilling fluid are not fine enough to complete the seal. It has been established that the maximum allowable drilling fluid loss is on the order of 1 bbl/hr (0.16 m$^3$/h), as measured in the mud pit at the surface.

There are numerous examples of patents teaching the use of various types of materials for use as lost circulation additives in drill fluids. The following are not an exhaustive sampling.

U.S. Pat. No. 2,610,149, issued Sep. 9, 1952, to Van Dyke, discloses the use of corn stalks, wood shavings, flake cellophane and chopped up paper in drilling fluids.

U.S. Pat. No. 2,779,417, issued Jan. 29, 1957, to Clark et al., discloses the use of cellophane, rice hulls and shredded paper as bridging agents in a well fluid.

U.S. Pat. No. 4,247,403, issued Jan. 27, 1981, to Foley et al., discloses the use of whole corncobs or the woody ring portion of corncobs as loss circulation additives for drilling fluids.

U.S. Pat. No. 4,474,665, issued Oct. 2, 1984 to Green, discloses a lost circulation material useful in drilling fluids formed from cocoa bean shell material having a particle size distribution from 2 to 100 mesh.

U.S. Pat. No. 4,579,668, issued Apr. 1, 1986 to Messenger, discloses for use as drilling fluid bridging agents, ground walnut shells, cellophane and shredded wood.

U.S. Pat. No. 5,004,553, issued Apr. 2, 1991, and U.S. Pat. No. 5,071,575, issued Dec. 10, 1991, both to House et al., disclose a well working composition containing oat hulls and optionally including one or more of ground corn cobs, cotton, citrus pulp, and ground cotton burrs.

U.S. Pat. No. 5,076,944, issued Dec. 31, 1991 to Cowan et al., discloses a seepage loss additive comprising ground cotton burrs in combination with one or more of ground oat hulls, ground corn cobs, cotton, ground citrus pulp, ground peanut shells, ground rice hulls, and ground nut shells.

U.S. Pat. No. 5,118,664, issued Jun. 2, 1992, and U.S. Pat. No. 5,599,776, issued Feb. 4, 1997, both to Burts, Jr., disclose the use of various comminuted plant materials as lost circulation materials.

U.S. Pat. No. 4,957,166, issued Sep. 18, 1990 to Sydansk, discloses the use of a water soluble carboxylate crosslinking polymer along with a chromic carboxylate complex crosslinking agent as a lost circulation material. Sydansk further teaches that the performance requirements of conformance improvement treatment polymers are different from those of lost circulation polymers. Thus, while U.S. Pat. No. 5,377,760, issued Jan. 3, 1995 to Merrill discloses addition of fibers to an aqueous solution of partially hydrolyzed polyacrylamide polymer, with subsequent injection into the subterranean to improve conformance, Sydansk teaches that such would not necessarily work for lost circulation treatment.

Additionally, Merrill's conformance treatment method of mixing the fibers with the polymer solution followed by injection, requires a multiplicity of storage and mixing tanks, and a metering system which must be operated during the operation of the well. Specifically, a first tank will store a water and polymer solution, a second tank will store a water and cross-linking solution, and a third tank will be used to mix fibers with polymer solution from the first tank to create a polymer/fiber slurry. This polymer/fiber slurry is then metered from the third tank and combined with cross-linking solution metered from the second tank to the well bore.

Thus, in spite of the advancements in the prior art, there still need for further innovation in the lost circulation additives.

There is need for further innovation for lost circulation additives utilizing a water soluble polymer.

There is another need for a lost circulation additive which would allow for simplification of the mixing equipment.

These and other needs in the art will become apparent to those of skill in the art upon review of this specification, including its drawings and claims.

SUMMARY OF THE INVENTION

It is an object of the present invention to provide for further innovation in lost circulation additives.

It is an another object of the present invention to provide for further innovation for lost circulation additives utilizing a water soluble polymer.

It is even another object of the present invention to provide for a lost circulation additive which would allow for simplification of the mixing equipment.

These and other objects of the present invention will become apparent to those of skill in the art upon review of this specification, including its drawings and claims.

According to one embodiment of the present invention there is provided a lost circulation additive comprising a dry mixture of water soluble crosslinkable polymer, a crosslinking agent, and a reinforcing material selected from among fibers and comminuted plant materials. In preferred embodiments, the polymer is an a carboxylate-containing polymer and the crosslinking agent is a chromic carboxylate complex. In other preferred embodiments, the reinforcing material may comprise hydrophobic fibers selected from among nylon, rayon, and hydrocarbon fibers, and/or hydrophilic fibers selected from among glass, cellulose, carbon, silicon, graphite, calcined petroleum coke, and cotton fibers. The comminuted plant material is selected from the group of comminuted plant materials of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

According to another embodiment of the present invention, there is provided a method of forming a lost circulation fluid. The method generally includes taking the above lost circulation additive and contacting it with water or other aqueous solution.

According to even another embodiment of the present invention, there is provided a method of preventing lost circulation. The method generally includes contacting the above described lost circulation additive with water or an aqueous solution to form a lost circulation fluid. The method then includes injecting the lost circulation fluid into the formation.

These and other embodiments of the present invention will become apparent to those of skill in the art upon review of this specification and claims.

DETAILED DESCRIPTION OF THE INVENTION

The lost circulation additive of the present invention includes polymer, cross-linking agent and either fibers or comminuted particles of plant materials. In a preferred embodiment of the present invention, the lost circulation additive is a dry mixture of polymer, cross-linking agent and either fibers or comminuted particles of plant materials.

Any suitable relative amounts of the polymer, cross-linking agent and either fibers or comminuted particles of plant materials may be utilized in the present invention provided that the desired lost circulation results are achieved. Generally, the fibers or comminuted particles will comprise in the range of about 1 to about 99 weight percent, preferably in the range of about 25 to about 90 weight percent, more preferably in the range of about 50 to about 80 weight percent, and even more preferably in the range of about 70 to about 75 weight percent, all based on the total wit of the polymer, fibers and particles. A suitable amount of crosslinking agent is provided to reach the desired amount of crosslinking. Suitable amounts of dispersants, retarders, accelerents, and other additives may be provided as necessary or desired.

The polymer utilized in the practice of the present invention is preferably water soluble and must be capable of being pumped as a liquid and subsequently crosslinked in place to form a substantially non-flowing crosslinked polymer which has sufficient strength to withstand the pressures exerted on it. Moreover, it must have a network structure capable of incorporating reinforcing fibers.

While any suitable water soluble polymer may be utilized, the preferred polymer utilized in the practice of the present invention is a carboxylate-containing polymer. This preferred carboxylate-containing polymer may be any crosslinkable, high molecular weight, water-soluble, synthetic polymer or biopolymer containing one or more carboxylate species.

The average molecular weight of the carboxylate-containing polymer utilized in the practice of the present invention is in the range of about 10,000 to about 50,000,000, preferably in the range of about 100,000 to about 20,000,000, and most preferably in the range of about 200,000 to about 15,000,000.

Biopolymers useful in the present invention include polysaccharides and modified polysaccharides. Non-limiting examples of biopolymers are xanthan gum, guar gum, carboxymethylcellulose, o-carboxychitosans, hydroxyethylcellulose, hydroxypropylcellulose, and modified starches. Non-limiting examples of useful synthetic polymers include acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

Any crosslinking agent suitable for use with the selected polymer may be utilized in the practice of the present invention. Preferably, the crosslinking agent utilized in the present invention is a chromic carboxylate complex.

The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The chromic carboxylate complex useful in the practice of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Non-limiting representative formulae of such complexes include:

$[Cr_3(CH_3CO_2)_6(OH)_2]^{1+}$;

$[Cr_3(CH_3CO_2)_6(OH)_2]NO_3 \cdot 6H_2O$;

$[Cr_3(CH_3CO_2)_6(OH)_2]^{3+}$; and $[Cr_3(CH_3CO_2)_6(OH)_2](CH_3CO_2)_3 \cdot H_2O$.

"Trivalent chromium" and "chromic ion" are equivalent terms encompassed by the term "chromium III" species as used herein.

The carboxylate species are advantageously derived from water-soluble salts of carboxylic acids, especially low molecular weight mono-basic acids. Carboxylate species derived from salts of formic, acetic, propionic, and lactic acid, substituted derivatives thereof and mixtures thereof are preferred. The preferred carboxylate species include the following water-soluble species: formate, acetate, propionate, lactate, substituted derivatives thereof, and mixtures thereof. Acetate is the most preferred carboxylate species. Examples of optional inorganic ions include sodium, sulfate, nitrate and chloride ions.

A host of complexes of the type described above and their method of preparation are well known in the leather tanning art. These complexes are described in Shuttleworth and Russel, Journal of the Society of Leather Trades' Chemists, "The Kinetics of Chrome Tannage Part I.," United Kingdom, 1965, v. 49, p. 133-154; "Part III.," United Kingdom, 1965, v. 49, p. 251-260; "Part IV.," United Kingdom, 1965, v. 49, p. 261-268; and Von Erdman, Das Leder, "Condensation of Mononuclear Chromium (III) Salts to Polynuclear Compounds," Eduard Roether Verlag, Darmstadt Germany, 1963, v. 14, p. 249; and incorporated herein by reference. Udy, Marvin J., Chromium. Volume 1: Chemistry of Chromium and its Compounds. Reinhold Publishing Corp., N.Y., 1956, pp. 229-233; and Cotton and Wilkinson, Advanced Inorganic Chemistry 3rd Ed., John Wiley and Sons, Inc., N.Y., 1972, pp. 836-839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent anion, e.g., CrCl3, may also be combined with the crosslinking agent complex to accelerate gelation of the polymer solution, as described in U.S. Pat. No. 4,723,605 to Sydansk, which is incorporated herein by reference.

The molar ratio of carboxylate species to chromium III in the chromic carboxylate complexes used in the process of the present invention is typically in the range of 1:1 to 3.9:1. The preferred ratio is range of 2:1 to 3.9:1 and the most preferred ratio is 2.5:1 to 3.5:1.

The additive of the present invention may comprise fibers or comminuted particles of plant materials, and preferably comprises comminuted particles of one or more plant materials.

Fibers suitable for use in the present invention are selected from among hydrophilic and hydrophobic fibers. Incorporation of hydrophobic fibers will require use of a suitable wetting agent. Preferably, the fibers utilized in the present invention comprise hydrophilic fibers, most preferably both hydrophilic and hydrophobic fibers.

With respect to any particular fiber employed in the practice of the present invention, it is believed that the longer the fiber, the more difficult it is to be mixed uniformly in solution. It is believed that fibers as long as 12,500 microns may tend to aggregate and form clumps. The shorter the fiber, it is believed the easier it is to mix in solution. On the other hand, the shorter the fiber, the greater the quantity necessary to provide the desired level of strength in a reinforced mature gel. In general, the fibers utilized in the present invention will have a length in the range of 100 microns to 3200 microns, preferable 100 microns to 1000 microns.

Non-limiting examples of suitable hydrophobic fibers include nylon, rayon, hydrocarbon fibers and mixtures thereof.

Non-limiting examples of suitable hydrophilic fibers include glass, cellulose, carbon, silicon, graphite, calcined petroleum coke, cotton fibers, and mixtures thereof.

Non-limiting examples of comminuted particles of plant materials suitable for use in the present invention include any derived from: nut and seed shells or hulls such as those of peanut, almond, brazil, cocoa bean, coconut, cotton, flax, grass, linseed, maize, millet, oat, peach, peanut, rice, rye, soybean, sunflower, walnut, wheat; various portions of rice including the rice tips, rice straw and rice bran; crude pectate pulp; peat moss fibers; flax; cotton; cotton linters; wool; sugar cane; paper; bagasse; bamboo; corn stalks; various tree portions including sawdust, wood or bark; straw; cork; dehydrated vegetable matter (suitably dehydrated carbonhydrates such as citrus pulp, oatmeal, tapioca, rice grains, potatoes, carrots, beets, and various grain sorghams); whole ground corn cobs; or various plant portions the corn cob light density pith core, the corn cob ground woody ring portion, the corn cob coarse or fine chaff portion, cotton seed stems, flax stems, wheat stems, sunflower seed stems, soybean stems, maize stems, rye grass stems, millet stems, and various mixtures of these materials.

Optionally, dispersant for comminuted plant material will be utilized the in the range of about 1 to about 20 pounds, preferably in the range of about 5 to about 10 pounds, and more preferably in the range of about 7 to about 8 pounds of dispersant may be utilized per pound of comminuted plant material. A non-limiting example of a suitable dispersant is NaCl.

Preferred comminuted materials useful in the practice of the present invention include those derived from peanuts, wood, paper any portion of rice seed or plant, and any portion of corn cobs.

These various materials can be comminuted to very fine particle sizes by drying the products and using hammer mills, cutter heads, air control mills or other comminution methods as is well known to those of skill in the comminution art. Air classification equipment or other means can be used for separation of desired ranges of particle sizes using techniques well-known in the comminution art.

Any suitable size of comminuted material may be utilized in the present invention, along as such size produces results which are desired. In most instances, the size range of the comminuted materials utilized herein will range from below about 8 mesh ("mesh" as used herein refers to standard U.S. mesh), preferably from about −65 mesh to about −100 mesh, and more preferably from about −65 mesh to about −85 mesh. Specifically preferred particle sizes for some materials are provided below.

Preferred mixtures of comminuted materials useful in the practice of the present invention include a rice fraction and peanut hulls; a rice fraction and wood fiber and/or almond hulls; a rice fraction and a corn cob fraction, preferably a chaff portion; and a corn cob fraction, preferably a pith or chaff portion, a rice fraction, and at least one of wood fiber, nut shells, paper and shredded cellophane.

Rice is commercially available in the form of rice hulls, rice tips, rice straw and rice bran, as these various parts of the rice plant are separated commercially and are widely available from rice mills. Preferably, the size range of the rice fraction utilized herein will range from below about 8 mesh ("mesh" as used herein refers to standard U.S. mesh), preferably from about −65 mesh to about −100 mesh, and more preferably from about −65 mesh to about −85 mesh.

After the corn kernels are removed, corn cobs consist of four principle parts that are arranged concentrically. The central portion is a very light density pith core, that is surrounded by a woody ring, that in turn is surrounded by a coarse chaff portion, that in turn is covered by a fine chaff portion. The coarse and fine chaff portions form the sockets for anchoring the corn kernels to the corncob. The normal methods of grinding corncobs produce a mixture of all four parts enumerated above. it is possible, however, to separate the woody ring material from the remainder of the cob. The chaff portion of the corncob remaining after removal of the woody ring material is known as "bees wings". In the present invention, any of the pith or chaff portions ("BPC") are the preferred portions of the corn cob, with the chaff portions being more preferred. A range of particle sizes of pith and chaff can be obtained from comminution, but the size range smaller than about 8 mesh is suitable for this invention. Preferably, a particle size distribution ranging from smaller than 8 mesh to smaller than 100 mesh is utilized.

Preferred woods for use as comminuted materials in the present invention include any type of hard wood fiber, including cedar fiber, oak fiber, pecan fiber and elm fiber. Preferably the wood fiber comprises cedar fibers.

Preferred nut shells for use in the present invention include pecan, walnut, and almond. Preferably, the nut shells comprise at least one of pecan or walnut shells.

Preferred particle sizes for the wood fibers, nut shells, paper and cellophane will generally range from about +10 mesh to −100 mesh. An illustration of a non-limiting particle size distribution for these materials would include particles of +10 mesh, +20 mesh, +30 mesh, +50 mesh, +60 mesh, +100 mesh, and −100 mesh.

For one of the preferred comminuted plant mixtures comprising a corn cob fraction, a rice fraction, and at least one of wood fiber, nut shells, paper and shredded cellophane, the mixture will generally comprise in the range of about 5 to about 95 weight percent rice, in the range of about 5 to about 95 weight percent corncob pith or chaff, with the total of ground wood fiber, ground nut shells, ground paper and shredded cellophane comprising in the range of about 5 to about 95 weight percent (weight percent based on the total weight of plant material in the mixture. Preferred ranges are about 20 to about 75 weight percent rice, about 5 to about 35 weight percent corncob pith or chaff, with the total of ground wood fiber, ground nut shells, ground paper and shredded cellophane comprising in the range of about 20 to about 75 weight percent. More preferred ranges are about 30 to about 50 weight percent rice, about 10 to about 30 weight percent corncob pith and chaff, with the total of ground wood fiber, ground nut shells, ground paper and shredded cellophane comprising in the range of about 25 to about 50 weight percent.

As these comminuted materials are to be added to a water base lost circulation fluid, a small amount of oil may optionally added to the mixture. This optional oil is preferably added while the plant materials are being mixed together. This mixing may take place in a ribbon blender, where the oil in the required amount is applied by a spray bar. The oil wets the particles and adds to their lubricity while at the same time helping to control dust produced by the mixing operation. A variety of oils may be utilized in the practice of the present invention in concentrations generally ranging from about 1 percent to about 5 percent by weight based on the total weight of the mixture of comminuted materials, more preferably ranging from about 1 percent to about 2 percent. A non-limiting example of a commercially available oil suitable for use in the present invention includes ISOPAR V, available from Exxon Corporation.

The various components of the present invention may be mixed in any suitable order utilizing mixing techniques as known to those in the art, including dry mixing of the various components prior to addition to water, or alternatively, either or both of the polymer and cross-linking agent may be utilized as a solution. Most preferably, the various components are mixed in dry form, and then contacted with water or aqueous solution to form a lost circulation fluid. This lost circulation fluid is then injected into the well as is known in the art.

For an example of polymers and crosslinking agents suitable for use herein and details regarding their making and use, please see U.S. Pat. Nos. 4,957,166 and 4,989,673, both incorporated herein by reference.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A lost circulation additive comprising a dry mixture a water soluble crosslinkable polymer, a crosslinking agent, and a reinforcing material selected from among fibers and comminuted plant materials.

2. The additive of claim 1 wherein the polymer is an a carboxylate-containing polymer and the crosslinking agent is a chromic carboxylate complex.

3. The additive of claim 2 wherein the reinforcing material comprises hydrophilic and hydrophobic fibers.

4. The additive of claim 3 wherein the hydrophobic fibers comprise at least one selected from the group of hydrophobic fibers consisting of nylon, rayon, and hydrocarbon fibers, and
    wherein the hydrophilic fibers comprise at least one selected from the group of hydrophilic fibers consisting of glass, cellulose, carbon, silicon, graphite, calcined petroleum coke, and cotton fibers.

5. The additive of claim 2 wherein the reinforcing material comprises comminuted plant material.

6. The additive of claim 5 wherein the reinforcing material comprises at least one comminuted material selected from the group of comminuted plant materials consisting of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

7. The additive of claim 2 wherein the polymer is a partially hydrolyzed polyacrylamide.

8. The additive of claim 7 wherein the reinforcing material is a comminuted material selected from among comminuted materials derived from peanuts, wood, paper any portion of rice seed or plant, any portion of corn cobs, and mixtures thereof.

9. The additive of claim 8 wherein the additive further includes cellophane, and wherein the reinforcing material is a comminuted material selected from among mixtures of comminuted rice fraction and peanut hulls; mixtures of comminuted rice fraction, and wood fiber or almond hulls; mixtures of comminuted rice fraction and corn cob fraction; and mixtures of comminuted rice fraction and corn cob fraction and at least one of wood fiber, nut shells, and paper.

10. The additive of claim 9 wherein the reinforcing material comprises comminuted mixture of rice fraction, corn cob pith and chaff, cedar fiber, nut shells, and paper.

11. A method of forming a lost circulation fluid comprising:
    (a) providing a lost circulation additive comprising a dry mixture of water soluble crosslinkable polymer, a crosslinking agent, and a reinforcing material selected from among fibers and comminuted plant materials; and
    (b) contacting the lost circulation additive with water or an aqueous solution to form the lost circulation fluid.

12. The method of claim 11 wherein the polymer is a partially hydrolyzed polyacrylamide, the crosslinking agent is a chromic carboxylate complex, wherein the additive further includes cellophane, and wherein the reinforcing material is a comminuted material selected from among mixtures of comminuted rice fraction and peanut hulls; mixtures of comminuted rice fraction, and wood fiber or almond hulls; mixtures of comminuted rice fraction and corn cob fraction; and mixtures of comminuted rice fraction and corn cob fraction and at least one of wood fiber, nut shells, and paper.

13. The additive of claim 12 wherein the reinforcing material comprises comminuted mixture of rice fraction, corn cob pith and chaff, cedar fiber, nut shells, and paper.

\* \* \* \* \*